F. & H. LEE.
SPINNER FOR FISHING.
APPLICATION FILED MAY 19, 1910.
968,961.
Patented Aug. 30, 1910.
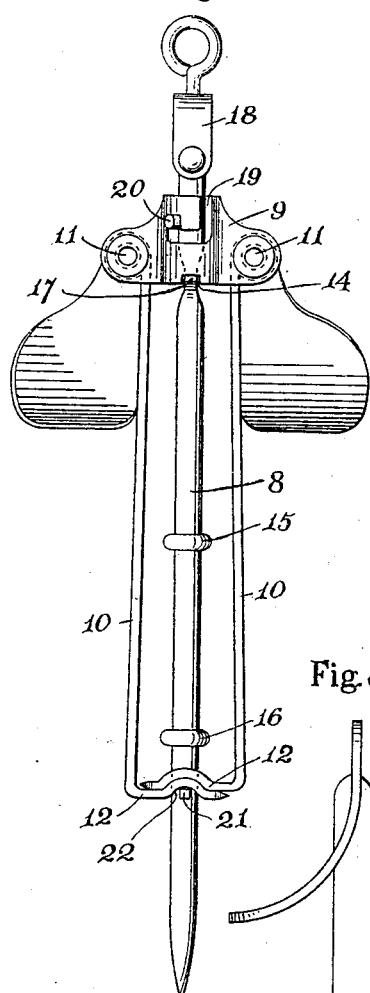
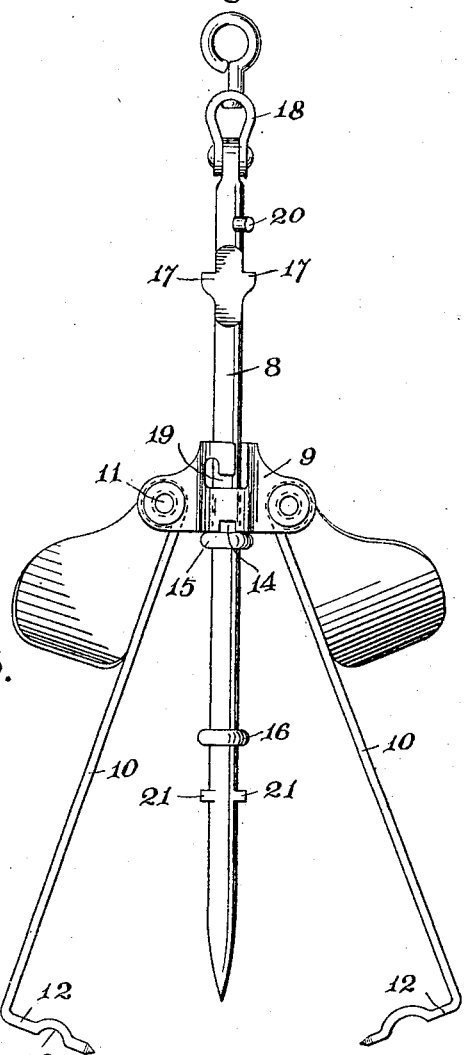
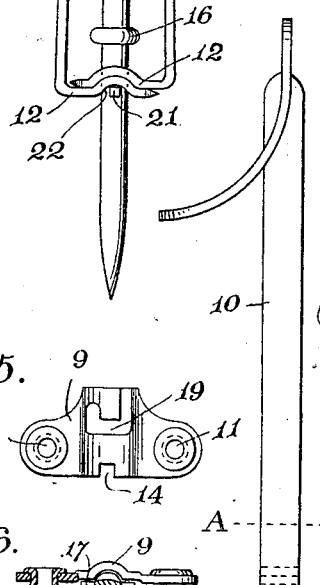
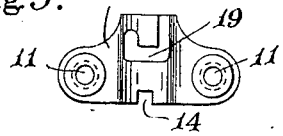
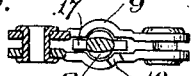
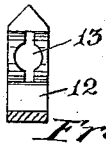
Inventors
Fredrick Lee
Harold Lee

UNITED STATES PATENT OFFICE.

FREDRICK LEE AND HAROLD LEE, OF REDDITCH, ENGLAND.

SPINNER FOR FISHING.

968,961.  Specification of Letters Patent.  Patented Aug. 30, 1910.

Application filed May 19, 1910. Serial No. 562,221.

*To all whom it may concern:*

Be it known that we, FREDRICK LEE and HAROLD LEE, subjects of the King of Great Britain, residing at 8 Victoria street, Redditch, England, have invented certain new and useful Improvements in Spinners for Fishing, of which the following is a specification.

This invention relates to improvements in spinners for fishing purposes, and its object is to provide improved means whereby the side pieces are firmly locked, so as to prevent the possibility of the bait becoming accidentally detached and lost.

The accompanying drawings illustrate this our invention, in which—

Figure 1 is a front view of a spinner constructed according to this our invention, showing the side pieces closed and locked. Fig. 2 is a similar view, but showing the side pieces unlocked and opened, ready for the bait to be attached. Fig. 3 is a side view of one of the side pieces, Fig. 4 being a sectional plan view on line A—B, showing more particularly the hole through which the central pin passes. Fig. 5 is a side view, and Fig. 6 a plan view in detail of the crosshead.

Referring to the drawings, 8 is the central pin upon which the other various parts of the spinner are mounted.

9 is a crosshead to which the side pieces 10, 10, are pivotally secured at 11, usually by means of eyelets. The lower ends 12 of these side pieces are bent inward at right angles, and in the said bent part of each side piece is formed the hole 13, so that when the two are closed together, as seen in Fig. 1, such holes assume a central position in line with each other. The crosshead 9 may be varied in construction, but is conveniently made of a front and rear plate connected together by the eyelets which form the joints for the side pieces already named. These front and rear plates are also shaped so as to form a longitudinal central passage between them, through which the pin may be moved. This passage is rectangular (or flat) in character, to suit the shoulders hereinafter named upon the pin, and upon each plate of the crosshead a central notch 14 is made for the purpose hereinafter explained.

The central pin is made with a point at its forward end to pierce the bait, and with stops 15 and 16 to limit its longitudinal movement in both directions. Near the upper end it is flattened, and of course is thus broadened. At this broadened part, shoulders 17, 17, are formed, which take into the notches 14 formed in the crosshead. The upper outer end of the pin is suitably connected up to the usual form of swivel or shackle 18.

19 is a bayonet slot in the crosshead 9, and 20 is a projecting peg formed upon the pin 8, which engages with said slot.

At the lower end of the pin 8, the peg 21 is provided, and in agreement therewith the holes 13 in the lower bent ends of the side pieces are shaped, so as to permit its passage through them in a given line. Also upon the underside of the lowermost of the side pieces is formed the upward recess 22, to accommodate the peg 21.

The action of the device may be briefly explained as follows: Upon the central pin being turned to the position wherein the flat part at the shoulders 17, 17, registers with the flat passage in the crosshead 9, it is withdrawn upward, (as seen in Fig. 2). The side pieces are now closed inward, when the pin is thrust forward through the bait (not shown) and through the two holes 13 in the bent parts of the side pieces, until the shoulders 17, 17, in the pin come below the head 9, and at the same time, the peg 20 has traveled to the bottom of the slot 19, and also, the peg or pegs 21 has reached a point below the recess 22. The pin is now turned around at right angles and then slightly drawn upward, which thus draws the said shoulders into the notches 14 in the crosshead 9, and the peg 20 into the final upward part of the slot 19, and also the peg 21 into the recess 22, and consequently the two side pieces are firmly locked to the central pin, preventing any possibility of loss of the bait. The reverse movement of course unlocks the side pieces.

It will of course be apparent that the locking device in connection with the shoulders 17, or the slot 19 and peg 20, or the peg 21 and recess 22, may be used either of them, separately, or two or more collectively, as may be desired.

What we claim as our invention and desire to secure by Letters Patent is:—

1. A device of the character described comprising a central pin, a part slidably mounted on the pin, side pieces pivotally hung from the slidable part and having inturned apertured lower end portions, the pin being adapted to pass through the aperture in the lower end portions and thereby hold the side pieces in closely associated relation, and means provided on the pin for engagement with the sliding part to hold the latter in the normal position when the side pieces are closed.

2. A device of the character described comprising a pin, a cross head slidable on the pin and provided with a bayonet slot, a projection carried by the pin for engagement in the bayonet slot to hold the cross head in its uppermost position, and side pieces pivotally hung from the cross head and having inturned lower end portions provided with apertures through which the pin may be passed, the cross head being held in its normal position when the side pieces are held in closely associated relation by the passage of the pin through said apertures.

In testimony whereof we have hereunto set our hands in presence of two subscribing witnesses.

FREDRICK LEE.
HAROLD LEE.

Witnesses:
J. BERNARD HAYWARD,
N. GOODWIN.